United States Patent
Noldus et al.

(10) Patent No.: US 9,699,644 B2
(45) Date of Patent: Jul. 4, 2017

(54) METHOD AND DEVICES FOR PROVIDING NETWORK IDENTIFICATION TO A UE

(71) Applicant: Telefonaktiebolaget LM Ericsson (publ), Stockholm (SE)

(72) Inventors: Rogier August Caspar Joseph Noldus, Goirle (NL); Magnus Olsson, London (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/914,842

(22) PCT Filed: Aug. 30, 2013

(86) PCT No.: PCT/EP2013/067999
§ 371 (c)(1),
(2) Date: Feb. 26, 2016

(87) PCT Pub. No.: WO2015/028083
PCT Pub. Date: Mar. 5, 2015

(65) Prior Publication Data
US 2016/0219428 A1    Jul. 28, 2016

(51) Int. Cl.
*H04W 4/00*    (2009.01)
*H04W 8/20*    (2009.01)
(Continued)

(52) U.S. Cl.
CPC ............. *H04W 8/205* (2013.01); *H04W 8/04* (2013.01); *H04W 8/12* (2013.01)

(58) Field of Classification Search
CPC .......... H04W 8/205; H04W 8/04; H04W 8/12
(Continued)

(56) References Cited

U.S. PATENT DOCUMENTS 8,503,361 B2 * 8/2013 Bienas ................. H04W 74/00
                                                    370/328
9,473,926 B2 * 10/2016 Rosar .................... H04W 8/082
(Continued)

OTHER PUBLICATIONS

BEREC—Body of European Regulators for Electronic Communications, Roaming Regulation—Choice of Decoupling Method A consultation to assist BEREC in preparing advice to the Commission on its forthcoming Implementing Act, BoR (12)68, XP055120826, Jun. 2012 (published Jul. 9, 2012), 72 pp.

(Continued)

*Primary Examiner* — Amancio Gonzalez
(74) *Attorney, Agent, or Firm* — Sage Patent Group (57) ABSTRACT

A UE has a subscription to a Home Public Land Mobile Network (H-PLMN) and has a subscription to an Alternative Roaming Provider (ARP) stored in a subscription database. The ARP is adapted to provide a communication service to the subscriber if the subscriber roams into a Visited Public Land Mobile Network (V-PLMN) which is different from the H-PLMN. The method includes registering the UE at a control node of the V-PLMN and sending, by the control node, a request for subscription data to the subscription database. The method further includes: sending, by the subscription database, an indication of the ARP to the control node; generating, by the control node, network identification information, based on the indication of the ARP and the indication of the V-PLMN; and sending, by the control node, the network identification information to the UE.

22 Claims, 4 Drawing Sheets

(51) Int. Cl.
*H04W 8/12* (2009.01)
*H04W 8/04* (2009.01)

(58) Field of Classification Search
USPC ..................................................... 455/432.1
See application file for complete search history.

(56) References Cited

U.S. PATENT DOCUMENTS

2010/0197236 A1* 8/2010 Kawamura ....... H04L 29/12028
455/67.7
2016/0066175 A1* 3/2016 Wang ...................... H04W 8/02
455/432.1

OTHER PUBLICATIONS

Koenig et al., "EC Competition and Telecommunications Law (International Competition Law Series)", Kluwer Law International, The Netherlands, XP002725163, Mar. 27, 2009, pp. 457.
Noldus et al., "Roaming Unbundling—Challenges and Opportunitis", *2013 17th International Conference on Intelligence in Next Generation Networks (ICIN)*, Venice, Oct. 15-16, 2013, pp. 118-125.
International Search Report and Written Opinion of the International Searching Authority, Application No. PCT/EP2013/067999, Aug. 30, 2013.

3GPP, Technical Specification—"3rd Generation Partnership Project; Technical Specification Group Services and System Aspects; Network Identity and TimeZone (NITZ); Service description; Stage 1 (Release 11)", 3GPP TS 22.042 V11.0.0 (Sep. 2012), 8 pp.
3GPP, Technical Specification—"3rd Generation Partnership Project; Technical Specification Group Core Network and Terminals; Numbering, addressing and identification (Release 11)", 3GPP TS 23.003 V11.5.0 (Mar. 2013), 83 pp.
3GPP, Technical Specification—"3rd Generation Partnership Project; Technical Specification Group Core Network and Terminals; Mobile radio interface Layer 3 specification; Core network protocols; Stage 3 (Release 12)", 3GPP TS 24.008 V12.2.0 (Jun. 2013), 682 pp.
3GPP, Technical Specification—"3rd Generation Partnership Project; Technical Specification Group Core Network and Terminals; General Packet Radio Service (GPRS); Serving GPRS Support Node (SGSN)—Visitors Location Register (VLR); Gs interface network service specification (Release 11)", 3GPP TS 29.016 V11.0.0 (Sep. 2012), 21 pp.
3GPP, Technical Specification—"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 12)", 3GPP TS 29.018 V12.1.0 (Jun. 2013), 62 pp.

* cited by examiner

METHOD AND DEVICES FOR PROVIDING NETWORK IDENTIFICATION TO A UE

CROSS REFERENCE TO RELATED APPLICATION

This application is a 35 U.S.C. §371 national stage application of PCT International Application No. PCT/EP2013/067999, filed on Aug. 30, 2013, the disclosure and content of which is incorporated by reference herein in its entirety. The above-referenced PCT International Application was published in the English language as International Publication No. WO 2015/028083 A1 on Mar. 5, 2015.

TECHNICAL FIELD

The present invention relates to methods of providing network identification information to a user equipment, UE, wherein the UE has a subscription to a home public land mobile network, H-PLMN, and a subscription to an Alternative Roaming Provider, ARP, wherein the subscription to the ARP is stored in a subscription database, and wherein the ARP is adapted to provide a communication service to the subscriber if the subscriber roams in a visited public land mobile network, V-PLMN, which is different to the H-PLMN.

BACKGROUND

Roaming of subscribers in areas covered by different network providers or operators is an already established and well-known principle. The subscribers which can be 2G (GSM=Global System for Mobile Communications) subscribers, 3G (UMTS=Universal Mobile Telecommunications System) subscribers or 4G (LTE=Long Term Evolution) subscriber are subscribers of a particular Public Land Mobile Network (PLMN) which can be named as their Home PLMN (H-PLMN). When a subscriber of an H-PLMN roams abroad the subscriber attaches to a PLMN in a visited network, named as Visited PLMN (V-PLMN) which identifies the foreign PLMN that the subscriber may attach to. Whilst the subscriber is attached to a particular V-PLMN the subscriber is served by the operator of the V-PLMN. Some call cases may be handled entirely in the V-PLMN whilst other services are partly executed in the H-PLMN and partly in the V-PLMN. An example for a call which is handled entirely in a V-PLMN is the establishment of a mobile originating (MO) call if no Customized Applications for Mobile network Enhanced Logic (CAMEL) control applies to the call. An example for a call partly handled in H-PLMN and V-PLMN is a mobile terminating (MT) call establishment. The concept of roaming abroad and attaching to a V-PLMN applies to circuit switched (CS) access, to packet switched (PS) access and to the evolved packet system (EPS) access.

To inform the user of a user equipment (UE) or mobile phone about the serving operator the name of the serving operator is shown on the display. The term "user equipment" is used but it may also be any other kind of mobile terminal or mobile phone, like a smartphone, a laptop or any other mobile equipment. When the UE is used in the H-PLMN the name of the H-PLMN is shown on the display. When the UE roams abroad it shows the name of a network to which the UE is attached at the display.

In one example the network name of the serving network is not broadcast by the network but a PLMN-identifier (PLMN-Id) is broadcast by a node of the serving network. This node can be a Base Transceiver Station (BTS), a NodeB or an enhanced NodeB (eNodeB) of the access network. The PLMN-id consists of a Mobile Country Code (MCC) and a Mobile Network Code (MNC) as standardized in 3GPP standard TS23.003 Version 11.5.0. The mobile terminal comprises a mapping table containing a relation between the PLMN-Id and the network name which is used globally. This mapping table in the mobile terminal is configured at production of the mobile terminal. Further it is possible to adapt the mapping table by adding new relations between a PLMN-Id and the network name.

Another possibility for providing the network name to the mobile terminal is standardized in the Network Identity and TimeZone (NITZ) standard 3GPP TS 22.042 Version 11.0.0. According to this standardized method the network name and time is provided to the mobile terminal by the PLMN and the mobile terminal shall present this information at the earliest opportunity to the user. 3GPP standard TS 24.008 Version 12.2.0 further specifies the corresponding signaling between the network and mobile terminal. The advantage of this method is that the provided network name can easy be adapted by the operator to override outdated PLMN-Id relations which are implemented during the production of the mobile terminal.

To implement new business models which may result in lower costs for the subscriber the European Commission (EC) mandates European operators to support a new concept known as Alternative Roaming Provider (ARP) as from Jul. 1, 2014. ARP entails that when a subscriber roams abroad the subscriber should have the possibility to obtain communication services from another operator than the H-PLMN operator who might have a roaming agreement with the V-PLMN operator. Therefore it is possible that the subscriber can select better conditions (price or service) when roaming to a location outside the H-PLMN coverage. The ARP acts as a Mobile Virtual Network Operator (MVNO) towards the subscriber. The subscriber's H-PLMN operator can be named as the Domestic Service Provider (DSP) in this context. The subscriber of the H-PLMN therefore has to sign a second subscription, namely a subscription with an ARP. When this subscriber roams with its UE within Europe (that is to say, countries within the European Community) the communication services are provided by the ARP instead of by the H-PLMN provider. The subscription to an ARP is optional and can be canceled. There also may be multiple ARPs which have different agreements with the operators. The usage of an ARP by an inbound roaming subscriber is transparent for the respective V-PLMN. The attachment of the inbound roaming subscriber to the V-PLMN is performed as normal. The V-PLMN does not differentiate between a regular inbound roaming subscriber attaching to this network and an inbound roaming subscriber who has signed up with an ARP, attaching to its network.

Further the EC stipulates that, besides ARP, also the possibility of a Local BreakOut (LBO) shall be offered to outbound roaming subscribers. LBO, as specified by the EU, entails that subscribers roaming within the EU should be able to acquire mobile data access in the foreign country through mobile data service offered by a Mobile Network Operator (MNO) in the visited country which can also be seen as an ARP. In LBO the data connection is established locally, i.e. through a Gateway GPRS Support Node (GGSN) in the V-PLMN. The data connection is charged by mobile data provider in the V-PLMN.

To inform the user about the current use of an ARP or a MNO/ARP in an LBO scenario there are some methods known in the prior art. The subscriber could receive a Short Message Service (SMS) message when roaming. The SMS comprises information about a possible ARP or an MNO. Further it is possible that the SMS comprises prices and other conditions. If the subscriber reverts to the H-PLMN services (e.g. because a prepaid credit is depleted) or the subscriber switches to another visited network operator for which ARP does not apply, the subscriber would then have to receive again an SMS message to inform about the changed conditions. Another possibility is to inform the user of a mobile terminal via an Unstructured Supplementary Service Data (USSD) message which provides a short-lived display notification. The USSD message appears on the screen for limited duration and is not stored in the phone. Both methods have the problem that the indication can easily be overlooked. In addition the display of information is only during a short time when USSD is used.

Another possibility is to install an application on a smartphone which checks the status and informs the user accordingly. This solution has the disadvantage that it requires data connection. This data connection is often switched off by the user ("data roaming—off") to save costs.

SUMMARY

Accordingly there is a need to inform the roaming user of a user equipment about the current subscription condition in a reliable and precise manner. This need is met by the independent claims. Advantageous embodiments are described in the dependent claims.

According to a first aspect, a method of providing network identification information to a user equipment, UE, is provided. The UE has a subscription to a Home Public Land Mobile Network, H-PLMN, and a subscription to an Alternative Roaming Provider, ARP, wherein the subscription to the ARP is stored in a subscription database. The ARP is adapted to provide a communication service to the subscriber if the subscriber roams into a Visited Public Land Mobile Network, V-PLMN, which is different to the H-PLMN. The method comprises the steps of registering the UE at a control node of the V-PLMN and sending, by the control node, a request for subscription data to the subscription database. Further the method comprises the steps of sending, by the subscription database, an indication of the ARP to the control node, generating, by the control node, network identification information, based on the indication of the ARP and the indication of the V-PLMN and sending, by the control node, the network identification information to the UE.

The invention further provides a control node in a Visited Public Land Mobile Network, V-PLMN, wherein a user equipment, UE, is registered at the control node and has a subscription to a home public land mobile network, H-PLMN, which is different to the V-PLMN and a subscription to an Alternative Roaming Provider, ARP. The subscription to the ARP is stored in a subscription database and the ARP is adapted to provide a communication service to the subscriber if the subscriber roams into a V-PLMN. The control node comprises a first sending unit, adapted to send a request for subscription data to the subscription database, a receiving unit, adapted to receive an indication of the ARP from the subscriber database, a processing unit, adapted to generate network identification information based on the indication of the ARP and an indication of the V-PLMN and a second sending unit, adapted to send the network identification information to the UE.

The invention further provides a subscription database in a home public land mobile network, H-PLMN, of a subscriber, comprising a storing unit which is adapted to store subscription data, related to the subscriber with a subscription to a provider of the H-PLMN and a further subscription to an alternative roaming provider, ARP. The ARP is adapted to provide a communication service to the subscriber if the subscriber roams into a visited public land mobile network, V-PLMN, which is different to the H-PLMN. The subscription database further comprises a receiving unit, adapted to receive a request for subscription data of the subscriber from a control node in the V-PLMN and a sending unit, adapted to send an indication of the ARP to the control node.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

BRIEF DESCRIPTION OF THE FIGURES

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with GSM/UMTS/LTE standard terminology to illustrate the present invention, they are equally applicable to other kinds of mobile communication systems. Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company or the Internet. Further, the term User Equipment (UE) used herein below may be any kind of mobile communication device like a mobile telephone, a Personal Digital Assistant (PDA), a network card, a laptop or any other mobile communication apparatus which is capable of communicating wirelessly (via an air interface) or wirelined with a network.

In the invention a subscriber is a user having a subscription to a home public land mobile communication network, H-PLMN. The subscription is a contract with a provider of the H-PLMN comprising e.g. service agreements like voice services or data services. The subscriber is using a UE for these services. The UE is related to the subscriber by inserting a SIM card, comprising the subscription identification and authentication key, into the UE. The user of the UE is the subscriber of the subscription which is linked to the UE.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1:
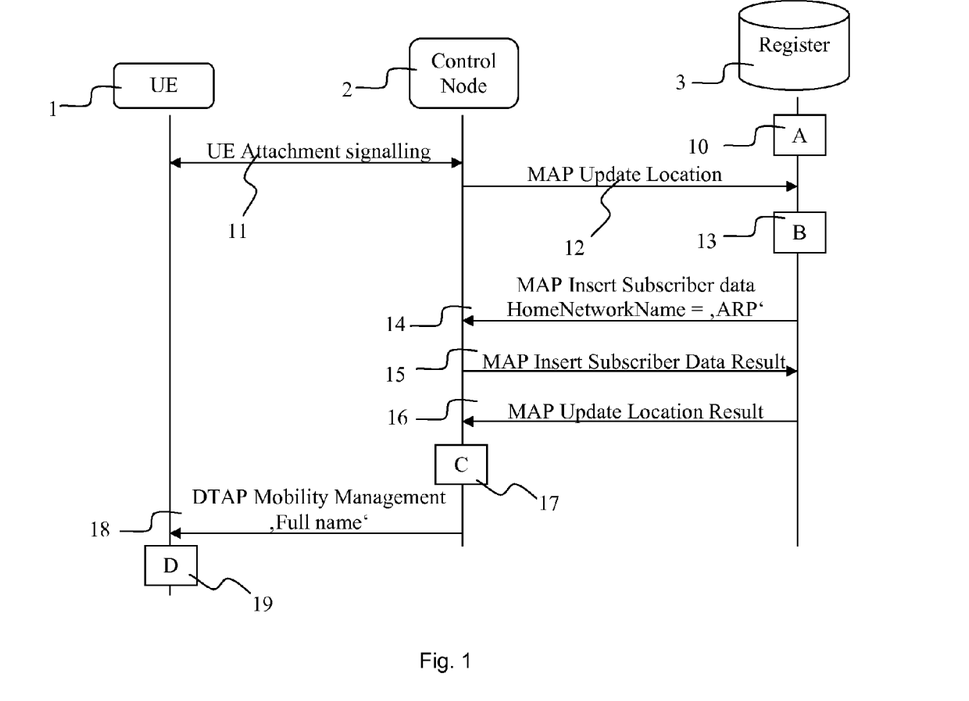
FIG. 1 shows a sequence diagram of one embodiment of the invention.

FIG. 1 shows one embodiment of the invention comprising a UE 1 which is attached to a control node 2 of a mobile communication network. It is assumed that the control node 2 is a control node of a Visited Public Land Mobile Network (V-PLMN) to which the UE 1 does not have a subscription. It may be possible that the UE 1 is roaming into this mobile communication network which may be located in another country.

The control node 2 may be any network node which is adapted to control the communication between the mobile communication network and the UE 1. The control node 2 may be a Mobile Switching Center (MSC) or a Serving GPRS Support Node (SGSN) in GSM/UMTS or 2G/3G networks. It is further possible that the control node 2 is a Mobility Management Entity (MME) in an LTE/EPC network. A person skilled in the art is aware of the fact that in case of LTE/EPC the messages between the control node 2 and the UE 1 in FIG. 1 will be according to a different protocol. UE attachment signalling 11 is exchanged between the UE 1 and the control node 2 according to the different protocols of the different network technologies to register the UE 1 in the V-PLMN. This signalling is adapted to prepare a communication establishment between the control node 2 and the UE 1.

FIG. 1 shows further a subscription database or register 3 which is adapted to store subscriber related data. This register 3 may be a Home Location Register (HLR) or a Home Subscriber Server (HSS). The register 3 may not be located in the V-PLMN but in the Home PLMN (H-PLMN) of the subscriber because only the register 3 in the H-PLMN of a UE 1 comprises the subscriber related data of the UE 1. To fetch data from this register 3 the control node 2 may contact the register 3 through a gateway control node in the H-PLMN of the subscriber (not depicted in the figures for clarity reasons). In this embodiment register 3 may comprise information that the UE 1 has a subscription to one operator which is the operator of the H-PLMN of the UE 1 and an alternative subscription of the UE 1 to an Alternative Roaming Provider (ARP). This information may be available at the register 3 at position (A) 10 before the UE 1 establishes a communication and may be inserted automatically into the register 3 after the subscription has been established or may be inserted manually into the register 3 via a user interface from the operator of the H-PLMN.

After UE attachment signalling 11 the control node 2 requests subscriber data from the register 3 related to the UE subscription. This may be implemented by sending a request for subscription data message to the Register 3 which may be a MAP Update Location request 12 in according to the GSM standard. At position (B) 13 the register 3 determines that the subscription of the UE 1 comprises a registration in a network where the additional ARP services apply. The register 3 is aware of the fact that the subscriber is now attaching to a V-PLMN that qualifies, for this subscriber, as an ARP territory. The communication services for this subscriber are offered by the ARP as long as the subscriber is attached in this V-PLMN and as long as the subscription to the ARP applies or is valid. The ARP subscription may be a subscription to a mobile data service in the V-PLMN, a subscription to a voice service in the V-PLMN or a subscription to both. It allows the subscriber to use these services under conditions which have been agreed between the V-PLMN operator and the ARP operator and which may be cheaper or may have better qualities than the normal roaming conditions. This aforementioned determination at position 'B' 13 by the register 3 may be based on parameters which have been included in the request 12 from the control node 2. The register 3 includes an indication of the ARP, which may be the network name of the ARP, into the reply "MAP Insert subscriber data" (ISD) message 14. According to 3GPP standard TS 29.002 Version 12.1.0 the syntax of the MAP ISD message comprising the new information about the network name of the ARP could be like this:

```
InsertSubscriberDataArg : := SEQUENCE {
  [. . .]
  homeNetworkName  [40]  HomeNetworkName  OPTIONAL}
  HomeNetworkName : := OCTET STRING (SIZE (1..32))
  -- The encoding of the octets shall follow the encoding that's
     applicable for the 'Full name for network' field in the 'MM
     information' and the 'GMM Information' specified in 3GPP
     TS 24.08.
```

The parameter "homeNetworkName" may be added to the ISD operation as an indication of the ARP. It may be possible that the parameter is a string or an identifier and the name of this parameter may vary. In this example the parameter is specified as an octet string of variable length in the range of 1 . . . 32 characters. The character set and encoding of the characters in the "HomeNetworkName" information element may follow the character set and encoding of the Mobility Management (MM) or GPRS MM (GMM) information as specified in 3GPP standard TS 24.008 Version 12.2.0.

It may also be possible to insert an identifier as an indication of the ARP. This identifier may be inserted in the HomeNetworkName parameter. This identifier may later on be mapped, by the control node 2, with the aid of a table which may be stored in the control node 2 and which comprises a relation between the identifier and the name of the ARP.

After the control node 2 in the V-PLMN has received the indication of the ARP as a MAP ISD message 14 comprising the network name or identifier of the ARP the control node 2 sends back a MAP Insert Subscriber Data Result message 15 to the register 3 which is answered by a MAP Update Location Result message 16 from the register 3 to the control node 2.

In a next step (C) 17 the control node 2 determines that it has received an indication of the ARP as a network name of an ARP or as an identifier. The control node 2 constructs or generates a full name based on the received indication of the ARP, which may be the network name or identifier of the ARP, and the already known indication of the V-PLMN which may be the network name of the V-PLMN. This already known indication of the V-PLMN may be pre-configured in the control node 2. It may be possible to fetch the name of the ARP, based on the received identifier, from a table which contains a relation between the identifier and the name of the ARP. This table may be stored in the control node 2 or in any other node which is accessible by the control node 2. The generation of the network identification information may be done by just putting the characters of the V-PLMN network name and the characters of the ARP in one single string together. The control node 2 may arrange the name of the V-PLMN and the name of the ARP into a single description field or string of the network identification information. It may be also possible to add some control signals which may add e.g. a line break into the single description field to force a display at the UE 1 in two lines.

With a DTAP Mobility Management message 18 the control node 2 sends the network identification information as a generated "full name" to the UE 1. At step (D) 19 the UE 1 shows the full name on its display to inform the user of the UE 1 about the use of the services of the ARP in the V-PLMN.

If e.g. the UE 1 has a subscription to "TeliaSonera" as his or her home PLMN, then the register 3 may be located in the network of "TeliaSonera". Now the UE 1 roams into a network of the operator "Telefonica". The control node 2 may be located in the "Telefonica" network. Further the UE 1 has a subscription to an ARP named "Roaming Voice" which provides services if the "TeliaSonera" subscriber roams into a "Telefonica" network. Both subscriptions are stored in the register 3. The control node 2 now receives as an indication of the ARP the name "Roaming voice" from the MAP ISD message 14 and combines this name with the name of the V-PLMN "Telefonica". It may be possible to add some additional characters, like brackets, words or control signals. The network identification information according to this example may be "Telefonica (via Roaming voice)" as the full name. This name may be displayed at the UE 1 in one line or two lines. The ARP may then provide a communication service to the UE 1 which can be a mobile data service or a voice service in the V-PLMN.

Figure 2:
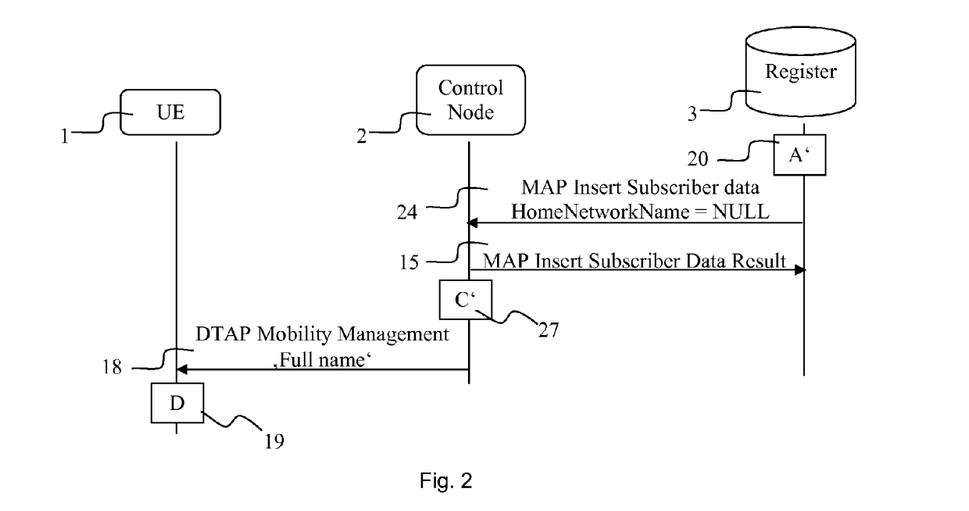
FIG. 2 shows a sequence diagram of another embodiment of the invention.

In a further embodiment according to FIG. 2 the subscription to the ARP provider is canceled or changed at position (A') 20. A reason could be that the subscriber changes the ARP because he or she has to roam into networks which are not covered by the old ARP. Assuming that the ARP and LBO mechanism will also be used in other regions than Europe one ARP may only cover e.g. European networks and another ARP may only cover East-Asian networks. Another example could be that the user of a UE stopped roaming into other networks and wants to cancel ARP subscription. If a change occurs, the subscription database or register 3 has to be updated 20. This may be done over an interface between the register 3 and the IT infrastructure of the ARP operator. The network name or indication of the ARP that was assigned to the ARP is no longer applicable and will be deleted. According to the aforementioned example of FIG. 1 the information element "homeNetworkName" may be set to NULL or to any other symbol which indicates that no ARP is available for this subscriber. If the ARP has been changed the "homeNetworkName" may comprise another ARP name or indication than before. Due to the change or deletion of the ARP name the register 3 initiates the sending of a stand-alone message 24 comprising a changed "homeNetworkName" or not comprising any information element related to the "homeNetworkName". This stand-alone message could be a MAP ISD message 24 according to 3GPP standard TS 29.002 Version 12.1.0. The "homeNetworkName" may be an optional information element in the MAP ISD message and may therefore be deleted from the message if no ARP subscription is available for this UE 1. As an answer the control node 2 sends back a result message 15 to acknowledge the received message 24. At (C') 27 the control node 2 determines that the "homeNetworkName" has not been received or the content of this information element is NULL. It may also be possible that this information element comprises a specific symbol or comprises a different name of a different ARP. The control node 2 initiates a message 18 to inform the UE 1 about the changed network name. This message may comprise the name of the V-PLMN without any further name if no ARP subscription is available. Related to the example above the network identification information or full name may be "Telefonica" or comprises the term "Telefonica" and a name of the new ARP if applicable. The message 18 can be a DTAP Mobility Management message. The UE 1 may display the received name on its display replacing the former name at position (D) 19. The subscriber now has an explicit, definitive and persistent indication that he or she is no longer using the services from the former ARP.

In another embodiment the control node 2 may send the network identification information which may be the full name generated at the control node 2 repeatedly to the UE 1 or at every attachment of the UE 1 to the control node 2. Repeatedly means that the information is sent automatically several times during a period. The advantage for sending this information repeatedly to the UE 1 may be that the control node 2 normally will not get any confirmation from the UE 1 that the UE 1 has received the network identification information. Sending this information repeatedly increases the chance that the UE 1 has received the network identification information properly.

Figure 3:
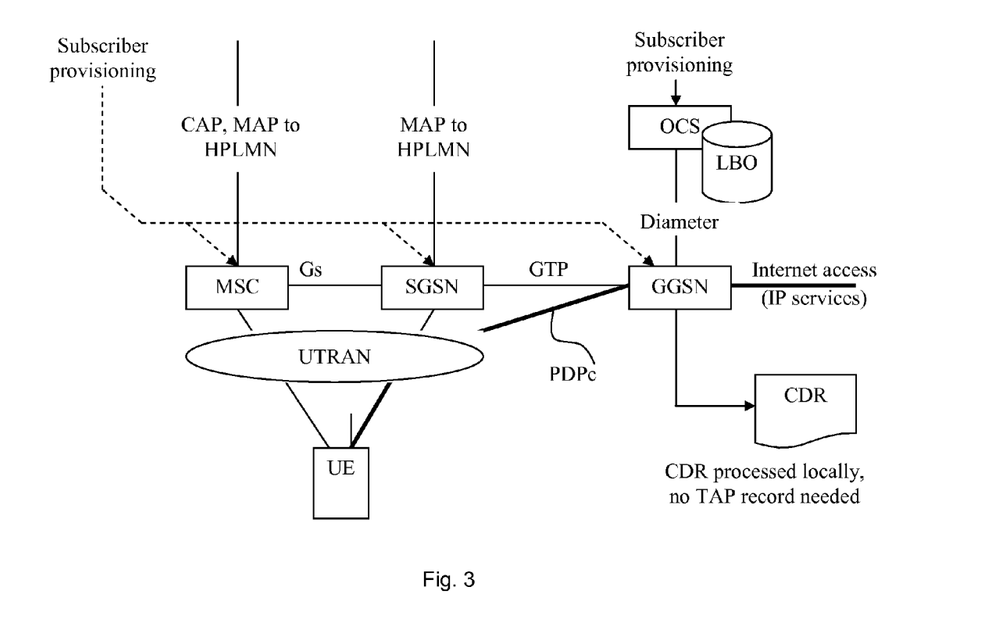
FIG. 3 shows a schematic illustration of an embodiment of the invention.

FIG. 3 reflects an embodiment of the invention in which the ARP comprises a Local Breakout (LBO) service in a V-PLMN. One aspect of LBO, when deployed in accordance with the present invention, is that a subscriber that is using LBO as an ARP service or intends to use LBO receives definitive indication that he or she is actually using LBO, i.e. that the data connection is provided by the local mobile data provider of the V-PLMN and not by the H-PLMN. Without this indication the end-user may not always be aware whether he or she is using LBO. Further the end-user does not know whether he or she is currently receiving mobile data connectivity at the rate offered by the local mobile data provider if this invention is not implemented.

The LBO service may be signaled to the subscriber in accordance with embodiments of FIG. 1 or 2. The ARP name may be different and may be something like "local data". In the following the service is only mentioned as the LBO service even if LBO is only one aspect or service of ARP. Therefore ARP is the generic name for any alternative service, like LBO.

The roaming subscriber from an H-PLMN attaches to the network from a V-PLMN. The subscriber had, prior to attachment, signed up as an LBO subscriber for the V-PLMN, entitling the subscriber to mobile data (internet access) through the network from the V-PLMN. The result of the LBO subscription is that the subscriber is provisioned in the respective systems from the V-PLMN, including at least the On-line charging system (OCS). Provisioning for LBO may be needed in the MSC, in the Gateway GPRS Support Node (GGSN) and in the Serving GPRS Support Node (SGSN). With this provisioning in place, the subscriber may establish PDP Context via GGSN from the V-PLMN. Charging for data volume will be done via OCS of the V-PLMN. The implementation of LBO may deviate, in part, from the architecture shown in FIG. 3. When the subscriber has signed up for LBO at the V-PLMN, the V-PLMN may send the Mobility Management (MM) Information or the GPRS MM (GMM) Information to the UE. MM Information is sent from the MSC to the UE and GMM Information is sent from the SGSN to the UE. In this manner, the network name on the display of the UE can be changed from the name of the V-PLMN to a combined name. In accordance with the aforementioned example the network identification information may read as "Telefonica (local data)". The subscriber now gets the definitive indication that he or she is using local data connection from Telefonica and not roaming data from its home provider.

Should the subscriber stop being V-PLMN LBO subscriber, then the control nodes in the network send again the MM Information and/or GMM Information to the UE. The name on the UE's display then changes back to the indication of the V-PLMN (in the example: "Telefonica"). This method is, furthermore, applied purely within the LBO operator's own network. Offering LBO to an inbound roaming subscriber is not dependent on signaling between H-PLMN and V-PLMN (apart from sending the appropriate Access Point Name, APN, from the H-PLMN to the V-PLMN, as part of the ARP subscriber's APN profile).

The enhanced network name may be provided to the UE via MM Information from the MSC to the UE, or via GMM Information, from the SGSN to the UE. A 3G terminal may at the same time be attached to an MSC and to an SGSN. It is assumed that procedures are in place and are operational for the network to determine whether network information shall be provided to the UE through MM Information, from the MSC, or through GMM Information, from the SGSN. The method of the present invention is suitable for both approaches.

When the subscriber signs up e.g. as "Telefonica" LBO subscriber, provisioning in the MSC may take place. The enhanced network name or network identification information, e.g. "Telefonica (local data)" is placed in the subscriber profile in the Visitor Location Register (VLR) of the MSC. The MSC sends the MM Information to the UE to update the UE's display, as described before.

It is also possible that when the subscriber signs up as "Telefonica" LBO subscriber, provisioning in the SGSN takes place. The enhanced network name "Telefonica (local data)" is then placed in the subscriber profile in the SGSN. The SGSN sends the GMM Information to the UE to update the UE's display, as described before. The network identification information or enhanced network name does not need to be provisioned in the GGSN.

The necessity of being informed about using local data connection arises when a data connection is established. One example is when a Packet Data Protocol context (PDPc), for internet access, is established. PDPc establishment is done through signaling between the SGSN and the GGSN via the Gateway Tunneling Protocol (GTP). When the UE establishes a PDPc and the SGSN determines that the PDPc may be established by means of LBO, the SGSN selects a local GGSN. The local GGSN may, as part of PDPc establishment procedure, interact with the OCS using e.g. Diameter protocol. When the OCS and the GGSN have completed their actions for PDPc establishment, the SGSN receives an acknowledgment that the PDPc is establishment. The acknowledgment from the GGSN to the SGSN that the PDPc is established with LBO may be used by the SGSN to send the GMM Information to the UE, to indicate the local data connection "Telefonica (local data)". As a variant, it may be considered to let the OCS or the GGSN return an explicit indication to the SGSN that the PDPc is established with LBO.

A further variant of the method of providing (G)MM Information to the UE is the following. The SGSN may be informed, explicitly or implicitly, by the GGSN that a PDPc is established with LBO. Instead of the SGSN sending GMM Information to the UE, the SGSN could coordinate this action with the MSC. Hereto, the SGSN uses the Gs reference point that is specified for information exchange between SGSN and MSC. The Gs reference point is specified in the standards 3GPP TS 29.016 Version 11.0.0 and 3GPP TS 29.018 Version 12.1.0. In this manner, the sending of the enhanced network name can be done through MM Information by the MSC, without the need for subscriber provisioning in the MSC. Whenever the subscriber established a PDPc with LBO, the MSC is informed by the SGSN. The MSC can then send the MM Information to the UE. When the data connection is terminated, the SGSN can again notify the MSC through the Gs reference point and then the MSC reverts to showing the Network name without LBO. In this manner, the MSC can combine enhanced network name for any other ARP service with the enhanced network name for LBO. The MSC can construct a network name reflecting the subscriber's ARP (the name of the ARP was received during Location Update), the LBO aspect (as informed by SGSN) or both. FIG. 3 further shows the establishment of a Call Detail Record (CDR) by the GGSN, for which CDR no TAP record needs to be produced. A TAP record would normally be needed, for mobile data usage, when said mobile data usage is chargeable by the H-PLMN provider. For LBO, the mobile data usage is chargeable by the V-PLMN provider. Hence, it is not needed, for LBO, to send a TAP record to the H-PLMN.

The person skilled in the art will know that when the packet access network is formed by the EPC+LTE, a Packet Data Gateway (PDGw) is used instead of GGSN and a Data bearer is established instead of PDPc. Hereafter, 'GGSN' is used to refer to both GGSN and PDGw, as appropriate for the context, and 'PDPc' is used to refer to both PDPc and Data bearer, as appropriate for the context.

The solution is also applicable to LTE/EPC with the MME performing the same function as the SGSN with the equivalent modifications.

The inventive concept is also applicable to subscribers of IP Multimedia Subsystem (IMS) based telephony. Reason is the differentiation in IMS as communication connectivity facilitator and MMTel as communication service facilitator. This is further elucidated through reference to FIG. 4. The IMS core network facilitates that communication connectivity can be established between subscribers. Hereto, the IMS core network is connected to the UE through one or more IP carrier access networks, such as the Enhanced packet system (EPS), WLAN, cable or other. In order to provide communication services, a number of application servers are connected to the IMS core network. A prominent example is the 3GPP Multimedia Telephony (MMTel) application server (MMTel-AS). The MMTel-AS provides Telephony potentially enhanced with operator-specific enterprise services or residential services. The IMS core network takes care of registration, mobility (including transfer between circuit switched (CS) access and packet switched (PS) access as well as access domain selection) and service invocation. The MMTel-AS and other designated application servers provide the actual Communication service.

Figure 4:
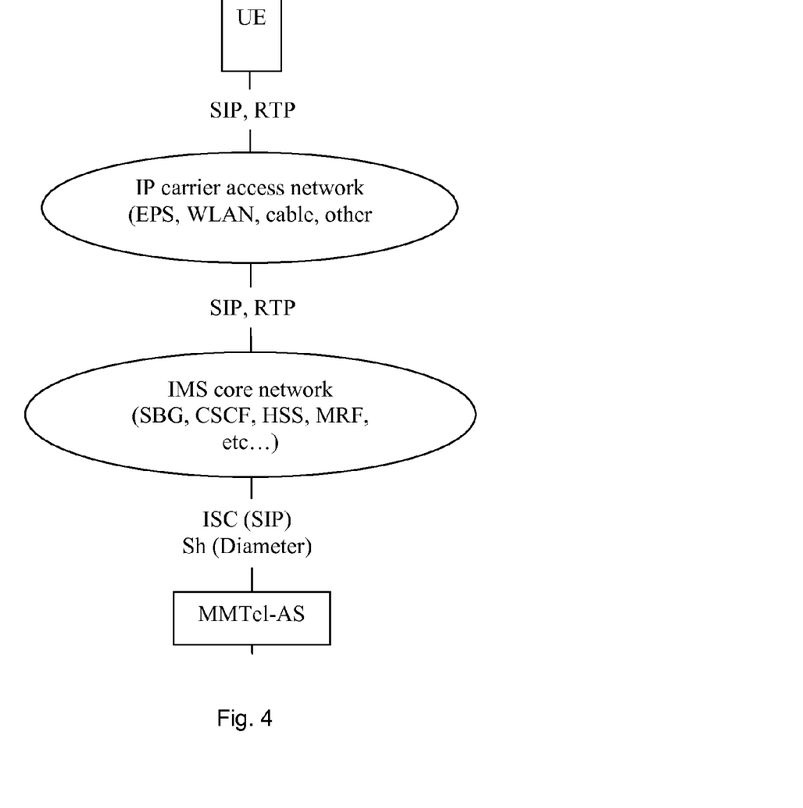
FIG. 4 shows a schematic illustration of another embodiment of the invention.

In 2G/3G networks, the core network, comprising e.g. the MSC, the HLR and/or other nodes is at the same time communication services facilitator. A subscriber of a PLMN provider may attach with his or her UE to the mobile access network of this provider or to a foreign mobile access network of another provider. The UE receives connectivity service(s) from the access network to which the UE is attached. When IMS based communication is considered, then in practice the operator that's operating the CS & PS access network in the V-PLMN will at the same time operate an IMS network, so that the visiting subscriber can register from the visited network into the IMS network. The operator in the V-PLMN is then acting as visited IMS network operator, versus the home IMS operator.

Figure 5:
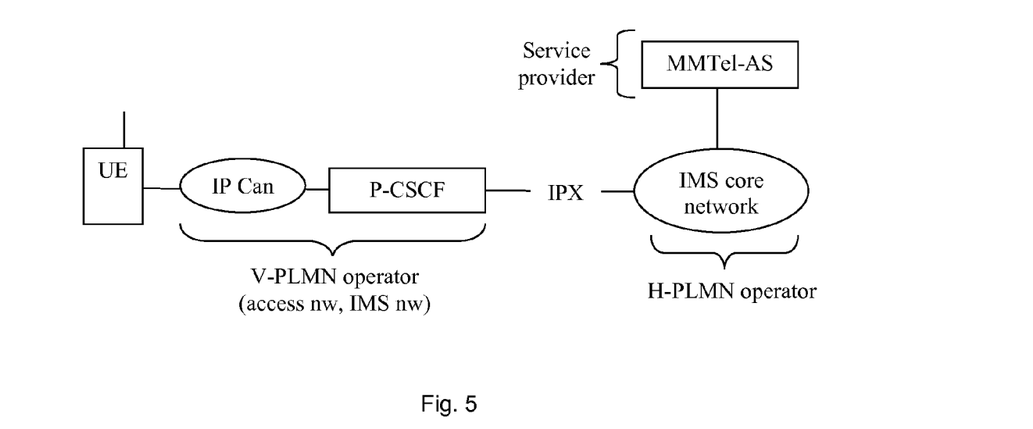
FIG. 5 shows a further schematic illustration of another embodiment of the invention.

Currently, the Home IMS network and Telephony service layer are commonly operated by the same operator. In the embodiment of FIG. 5, the H-PLMN operator is both IMS network operator and Communication services provider. The architecture of IMS is designed around the principle that Communication connectivity and Communication services may be operated by different parties. It is to be expected that there will be proliferation of parties offering IMS based communication service, without owning and operating an IMS network. Such party may offer its (IMS based) communication services through a variety of IMS networks. The IMS networks are in such constellation merely providing communication connectivity (and mobility). The real service, namely telephony, is provided by said communication services provider.

The signaling used in the IMS network for attaching to an IP carrier access network and registering as IMS subscriber does not support the above-described differentiation. For example, a subscriber of the IMS network of the H-PLMN provider will attach to an IP CAN and will register as subscriber of the H-PLMN. The signaling used in the IMS network, the Session Initiation Protocol (SIP), is grafted on the given that the subscriber is a subscriber of the H-PLMN. This subscriber may, however, receive his or her Telephony, i.e. the *real* communication service, from another party, e.g. from an independent communication service provider.

Figure 6:
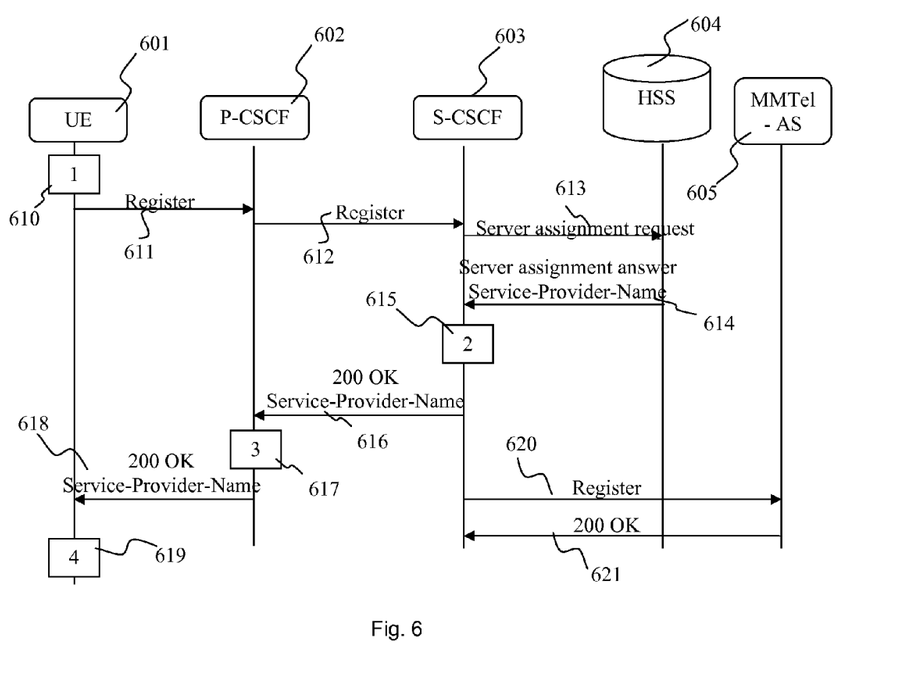
FIG. 6 shows a sequence diagram of another embodiment of the invention.

FIG. 6 shows another embodiment of the invention wherein the UE 601 is registered in IMS. This figure does not show all aspects of registration 611, 612 such as Proxy-Call Session Control Function (P-CSCF) discovery, SIP routing through the Interrogating (I)-CSCF, Home Subscriber Server (HSS) query by the I-CSCF, authentication etc. Therefore the Register messages 611, 612 are only replacements for this complex procedure and comprise all necessary steps for registering the UE 601 in the IMS.

A pre-amble to this procedure is that the subscriber is provisioned in the HSS 604 with the name (display name) of the ARP operator from which the subscriber will obtain the MMTel services (i.e. telephony). This information may be included in the Initial filter criteria (IFC). More specifically, it may be included in the Service point trigger (SPT) that defines the third party registration to MMTel-AS 605. This SPT contains the address of the MMTel-AS 605 (for sending the Register request) as well as some other parameters, such as an indication that the Register request towards MMTel-AS 605 shall include an integral copy of the Register request 611, 612 received from UE 601 and/or an integral copy of the '200 Ok' message 616 sent towards UE 601. An additional parameter may hence be included in the SPT, indicating that the '200 Ok' message 616 sent towards the UE shall include the display name received from the subscription database which may be an HSS 604.

At position (1) 610, the UE 601 attaches to the PS access network, such as the Evolved Packet Switched (EPS) network. When the UE 601 has gained IP connectivity, it initiates the IMS registration 611 at the Proxy CSCF (P-CSCF) 602. The P-CSCF 602 acts as a Proxy Server for the Serving (S)-CSCF 603 which may be located in the H-PLMN of the subscriber. Details of the EPS access and the IMS registration are not depicted and described due to clarity reasons. The IMS registration is towards the IMS home network of the subscriber using standard signaling procedure for registration. In a next step the P-CSCF 602 processes the IMS registration. This involves forwarding 612 the registration message 611 to the S-CSCF 603, upon which the S-CSCF 603 interacts with the HSS 604. This interaction comprises the sending of a request for subscription data, which may be the 'Register' message 612 and a Diameter message 'Server Assignment Request' (SAR) 613, and the receiving in reply to the SAR 613, a Diameter message 'Server Assignment Answer' (SAA) 614. The 'Server Assignment Request' (SAR) message 613 is related to the 'Register' message 612 such that both messages can be seen as a request for subscription data. The 'Register' message 612 will influence the sending of the 'Server Assignment Request' (SAR) 613 which comprises some of the information from the 'Register' message 612. The request for subscription data 612, 613 comprises a Register message 612 and a Server assignment request 613. The S-CSCF 603 will trigger the sending of the 'Server assignment request' 613 upon reception of the 'Register' message 612. The S-CSCF 603 copies certain information from the 'Register' message 612 into the 'Server assignment request' 613.

The Diameter SAA 614 includes the IMS subscription data, including the IFC. The S-CSCF 603 determines from the IFC that this subscriber subscribes to an ARP service which may be a Multimedia Telephony services from an ARP operator. This follows directly from the IFC, by virtue of the fact that the IFC contains an SPT indicating that the subscriber shall be registered with a particular MMTel-AS 605. This is reflected in FIG. 6 through the 'Register' message 620 and '200 Ok' message 621 between the S-CSCF 602 and the MMTel-AS 605.

There will, for the Voice over LTE (VoLTE) subscriber, also be third party registration to an SCC-AS. This is not reflected in FIG. 6 due to clarity reasons. The S-CSCF 603 also determines, from inspecting the IFC at position (2) 615, that it shall place the name of the ARP and the V-PLMN operator as network identification information into a designated SIP header in the '200 Ok' message 616. The P-CSCF 602 generates at position (3) 617, based on this information, a network identification information. This header contains the name of the MMTel service facilitator and the name of the V-PLMN operator. The inclusion of this header in the '200 Ok' message 618, as well as its contents, is derived from the IFC, as described above. The name of the MMTel service as the ARP service is combined with the name of the V-PLMN which serves the UE 601 in a way which has been already described with regard to FIGS. 1 and 2.

The '200 Ok' messages 616 travels backwards from the S-CSCF 603 towards the P-CSCF 602, traversing entities such as the I-CSCF and, in the case of IMS roaming, also an Interconnection Border Control Function (IBCF) at the network boundary of the home IMS network and an IBCF at the network boundary of the visited IMS network. The SIP header 'Service-Provider-Name' traverses transparently any SIP proxies between S-CSCF 603 and UE 601. The SIP header has no relation to the routing of the SIP message.

At position (4) 619, the UE 601 receives the '200 Ok' message 618, including the 'Service-Provider-Name' header comprising the network identification information. This SIP header is a definitive indication to the UE 601 that the subscriber is served, for telephony communication service, by the party indicated in this SIP header. The UE 601 places this header on the display. The name of the MMTel service provider may be placed alongside the mobile access operator name of the V-PLMN.

When the subscriber roams to another country, attaches to an EPS in that country and registers as IMS subscriber through the visited IMS network, the UE 601 will get the same indication on the display regarding the MMTel service provider. When the ARP concept is applied to VoLTE based telephony, the provided mechanism, namely the inclusion of the Service-Provider-Name in the '200 Ok' message 618, for displaying the telephony facilitator's name on the UE's display, can be used for this purpose. The ARP subscription may be reflected in the IMS subscription—more specifically in the IFC, indicating that the required operator name needs to be included in the '200 Ok' message 618.

Figure 7:
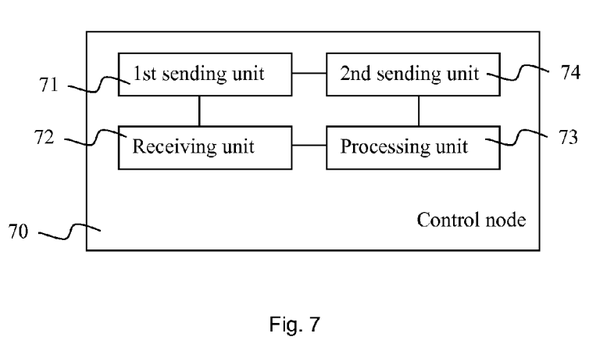
FIG. 7 shows a block diagram of a control node according to an embodiment of the invention.

FIG. 7 depicts a control node 70 according to one embodiment of the invention. The control node 70 comprises a first sending unit 71, adapted to send a request for subscription data to a subscription database. Further the control node 70 comprises a receiving unit 72, adapted to receive an indication of the ARP from the subscriber database and a processing unit 73, adapted to generate network identification information based on the indication of the ARP and the indication of the VPLMN. The control node 70 comprises a second sending unit 74, adapted to send the network identification information to a UE. The first and the second sending units 71, 74 may be a combined sending unit which is adapted to perform the functionality of both separate sending units 71, 74. The control node 70 may be a Mobile Switching Center, MSC, in a 2G network or a Serving GPRS (General Packet Radio Service) Support Node, SGSN in a 2G/3G network or an MME in an Enhanced Packet core (EPC) network. Further the control node 70 may be a Proxy Call Session Control Function (P-CSCF) of an IMS network.

Figure 8:
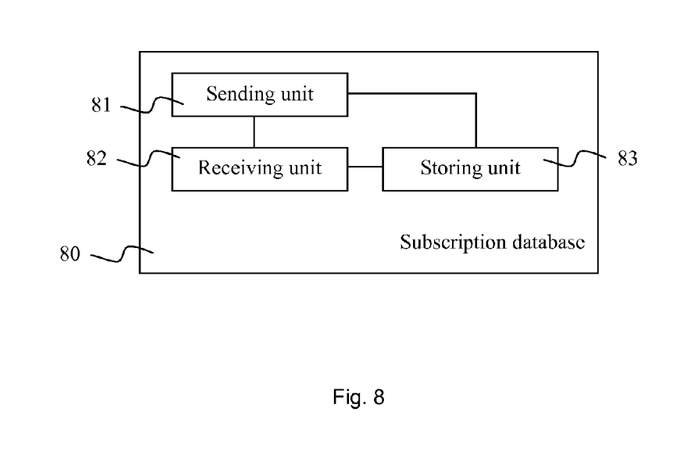
FIG. 8 shows a block diagram of a subscription database according to an embodiment of the invention.

FIG. 8 depicts a subscription database 80. This subscription database 80 can also be named as a register. The subscription database 80 may be a Home Location Register (HLR) or a Home Subscriber Server (HSS). An HLR is a database that facilitates call switching and that carries out mobility management functions for mobile phones roaming. The HLR originally applies in the circuit-switched (CS) core network, which is used for traditional GSM services such as voice calls, SMS, and circuit switched data calls. The CS core network was subsequently extended with overlay architecture to provide packet-switched data services. The overlay architecture is known as the GPRS core network. This allows mobile phones to have access to services such as WAP, MMS, and the Internet. The HSS is a master user database that supports the IMS network entities as well as the EPC network entities. It contains subscription-related information (subscriber profiles), performs authentication and authorization of the user, and can provide information about the subscriber's location and IP information. It is in many aspects similar to the GSM Home Location Register (HLR) and Authentication Centre (AuC).

The subscription database 80 comprises a storing unit 83 which can be an additional database or which can be part of the subscription database. The storing unit 83 is adapted to store subscription data, related to a subscriber with a subscription to a provider of the H-PLMN. As an example the subscription data of a subscriber can be service indicators, indicating a service to which the subscriber has made a subscription. A further example may be access restrictions or charging characteristics of this specific subscriber. The subscription database 80 is located in the home public land mobile network, H-PLMN, of the subscriber. According to the invention the storing unit 83 is further adapted to comprise a further subscription to an alternative roaming provider, ARP. The ARP is adapted to provide a communication service to the subscriber if the subscriber roams into a visited public land mobile network, V-PLMN, which is different to the H-PLMN. The subscription database 80 further comprises a receiving unit 82 which is adapted to receive a request for subscription data of the subscriber from a control node in the V-PLMN. This request may not be sent directly from the control node of the V-PLMN to the subscription database 80. The request may be sent over several other nodes to the subscriber database 80, like gateway nodes or the like. The subscription database 80 further comprises a sending unit 81 which is adapted to send an indication of the ARP to the control node. The indication of the ARP may be the name of the ARP or any other identifier. The indication may also be sent via other nodes to the control node.

The invention claimed is:

1. A method of providing network identification information to a user equipment, UE, wherein the UE has a subscription to a Home Public Land Mobile Network, H-PLMN, and a subscription to an alternative roaming provider, ARP, wherein the subscription to the ARP is stored in a subscription database, and wherein the ARP is configured to provide a communication service to the subscriber if the subscriber roams into a Visited Public Land Mobile Network, V-PLMN, which is different to the H-PLMN, comprising:
   registering the UE at a control node of the V-PLMN;
   sending, by the control node, a request for subscription data to the subscription database;
   sending, by the subscription database, an identification of the ARP to the control node;
   generating, by the control node, network identification information, based on the identification of the ARP and an identification of the V-PLMN; and
   sending, by the control node, the network identification information to the UE.

2. The method according to claim 1, wherein the ARP subscription is a subscription to a mobile data service in the V-PLMN, a subscription to a voice service in the V-PLMN or a subscription to both.

3. The method according to claim 1, wherein the network identification information is sent to the UE by the control node if a Packet Data Protocol context (PDPc) is established.

4. The method according to claim 1, wherein sending the identification of the ARP to the control node is performed by the subscription database as an answer to the received request for subscription data.

5. The method according to claim 1, wherein the identification of the ARP comprises a name of the ARP.

6. The method according to claim 1, wherein the method further comprises providing, by the ARP, a communication service to the subscriber.

7. The method according to claim 6, wherein the communication service is provided by the ARP to the subscriber after the network identification is sent to the UE.

8. The method according to claim 1, wherein the network identification information is a name generated by arranging the name of the V-PLMN and the name of the ARP into a single description field or string.

9. The method according to claim 1, wherein the network identification information is sent by the control node to the UE using the Network Identity and Time Zone (NITZ) mechanism by complying with the specified character set.

10. The method according to claim 1, wherein the network identification information comprises a control signal which is configured to control the display of the network identification information at the UE.

11. The method according to claim 1, further comprising:
notifying, by the ARP, the subscription database that the ARP subscription is changed; and
updating, by the subscription database, the control node about the changed ARP subscription.

12. The method according to claim 11, wherein the change of ARP subscription is a cancelation of the ARP subscription.

13. The method according to claim 1, wherein the network identification information is sent repeatedly to the UE.

14. The method according to claim 1, wherein the request for subscription data is an Update Location message.

15. The method according to claim 1, wherein the request for subscription data comprises a Register message and a Server assignment request, whereby a Serving Call Session Control Function, S-CSCF, will trigger the sending of the Server assignment request upon reception of the Register message.

16. The method according to claim 1, wherein the control node is a Mobile Switching Center, MSC, or a Serving GPRS Support Node, SGSN and the subscription database is a Home Location Register, HLR.

17. The method according to claim 1, wherein the control node is a Proxy Call Session Control Function, P-CSCF or a Mobility Management Entity, MME, and the subscription database is a Home Subscriber Server, HSS.

18. A control node in a Visited Public Land Mobile Network, V-PLMN, wherein a user equipment, UE, is registered at the control node and has a subscription to a home public land mobile network, H-PLMN, which is different to the V-PLMN and a subscription to an alternative roaming provider, ARP, wherein the subscription to the ARP is stored in a subscription database, and wherein the ARP is configured to provide a communication service to the subscriber if the subscriber roams into a V-PLMN, comprising:
a first sending unit, configured to send a request for subscription data towards the subscription database;
a receiving unit, configured to receive an identification of the ARP from the subscriber database;
at least one processor configured to generate network identification information based on the identification of the ARP and an identification of the V-PLMN; and
a second sending unit, configured to send the network identification information to the UE.

19. The control node according to claim 18, wherein the ARP subscription is a subscription to a mobile data service in the V-PLMN, a subscription to a voice service in the V-PLMN, or a subscription to both.

20. A subscription database in a home public land mobile network, H-PLMN, of a subscriber, comprising a storing unit which is configured to store subscription data, related to the subscriber with a subscription to a provider of the H-PLMN and a further subscription to an alternative roaming provider, ARP, wherein the ARP is configured to provide a communication service to the subscriber if the subscriber roams into a visited public land mobile network, V-PLMN, which is different to the H-PLMN, and wherein the subscription database further comprises:
a receiving unit, configured to receive a request for subscription data of the subscriber from a control node of the V-PLMN; and
a sending unit, configured to send an identification of the ARP towards the control node for generation of network identification information, based on the identification of the ARP and an identification of the V-PLMN.

21. The subscription database according to claim 20, wherein the subscription database comprises at least one processor configured to send the identification of the ARP to the control node as an answer to the received request for subscription data.

22. A computer program product comprising a non-transitory computer readable storage medium storing instructions which, when executed on at least one processor, cause the at least one processor to carry out the method according to claim 1.

* * * * *